United States Patent
Chi et al.

(10) Patent No.: US 11,431,820 B1
(45) Date of Patent: Aug. 30, 2022

(54) METHOD AND SYSTEM FOR IMPLEMENTING INTER-PROCESS COMMUNICATIONS

(71) Applicant: Industrial Technology Research Institute, Hsinchu (TW)

(72) Inventors: Ping-Hsien Chi, Taipei (TW); Chuan-Sheng Lin, Kaohsiung (TW); Yu-Hsuan Chi, Taipei (TW); Yi-Wen Li, Yunlin County (TW); Yun-Chen Tsai, Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 17/561,610

(22) Filed: Dec. 23, 2021

(30) Foreign Application Priority Data

Nov. 5, 2021 (TW) .................................. 110141318

(51) Int. Cl.
| | | |
|---|---|---|
| *H04L 67/2866* | (2022.01) | |
| *H04L 67/63* | (2022.01) | |
| *H04L 67/564* | (2022.01) | |
| *H04L 67/567* | (2022.01) | |

(52) U.S. Cl.
CPC ........ *H04L 67/2866* (2013.01); *H04L 67/564* (2022.05); *H04L 67/567* (2022.05); *H04L 67/63* (2022.05)

(58) Field of Classification Search
None
See application file for complete search history.

(56) References Cited

U.S. PATENT DOCUMENTS

| | | |
|---|---|---|
| 9,204,264 B2 | 12/2015 | Haruna et al. |
| 9,210,212 B2 | 12/2015 | Ivashin et al. |
| 9,384,024 B2 | 7/2016 | Ramakrishnan Nair |
| 9,622,068 B2 | 4/2017 | Mijar et al. |
| 9,930,124 B2 | 3/2018 | Noldus et al. |
| 2006/0230105 A1 | 10/2006 | Shappir et al. |
| 2010/0121927 A1* | 5/2010 | Zhang .................. G06F 9/54 726/1 |
| 2012/0030685 A1 | 2/2012 | Jackson |

(Continued)

FOREIGN PATENT DOCUMENTS

| | | |
|---|---|---|
| CN | 101754466 | 9/2012 |
| CN | 102915292 | 2/2013 |

(Continued)

OTHER PUBLICATIONS

"Office Action of Taiwan Counterpart Application", dated May 10, 2022, p. 1-p. 9.

*Primary Examiner* — Jeffrey R Swearingen
(74) *Attorney, Agent, or Firm* — JCIPRNET

(57) ABSTRACT

The disclosure provides a method and system for implementing inter-process communications. The method includes sending, by a first application, a first message to a forwarding application according to a first preset inter-process communication mode. The first message includes transmission data and identification information of a second application; obtaining, by the forwarding application, the second application in response to the first message; and sending, by the forwarding application, the transmission data to the second application according to a second preset inter-process communication mode of the second application.

22 Claims, 3 Drawing Sheets

(56) References Cited

U.S. PATENT DOCUMENTS

| | | |
|---|---|---|
| 2013/0232480 A1 | 9/2013 | Winterfeldt et al. |
| 2013/0232498 A1 | 9/2013 | Mangtani et al. |
| 2014/0215236 A1 | 7/2014 | Heinrich et al. |
| 2016/0182645 A1 | 6/2016 | Panec et al. |
| 2016/0373390 A1* | 12/2016 | Wood .................... H04L 41/044 |
| 2017/0026319 A1 | 1/2017 | Keating et al. |
| 2018/0096305 A1 | 4/2018 | Ishikawa et al. |
| 2018/0232315 A1 | 8/2018 | Wibling et al. |
| 2021/0119892 A1 | 4/2021 | Kant et al. |

FOREIGN PATENT DOCUMENTS

| | | |
|---|---|---|
| TW | 201525698 | 7/2015 |
| TW | 201743207 | 12/2017 |
| TW | 201903616 | 1/2019 |

\* cited by examiner

METHOD AND SYSTEM FOR IMPLEMENTING INTER-PROCESS COMMUNICATIONS

CROSS-REFERENCE TO RELATED APPLICATION

This application claims the priority benefit of Taiwan application serial no. 110141318, filed on Nov. 5, 2021. The entirety of the above-mentioned patent application is hereby incorporated by reference herein and made a part of this specification.

TECHNICAL FIELD

The disclosure relates to a program communication mechanism, and particularly, to a method and a system for implementing inter-process communications.

BACKGROUND

In the current Android virtual mobile infrastructure (VMI) solution, the user experience greatly affects the success or the failure of the product. If a use environment that is more similar to the physical machine can be provided, it is easier for a user to accept the product, and the product has a high chance to succeed. The use environment is not constrained to the end user experience but also includes the convenience for developers when developing application software.

For developers, if the function of inter-process communication between different programs can be achieved without changing their original development habits, the willingness of customers to use and the willingness to develop the product may be increased.

Implementing the inter-process communications (IPC) is highly complex due to problems, such as the need to manage and deal with message synchronization and state synchronization between different operating systems, and complicate situations, such as network penetration. The situations include: (1) communication between different applications of a single operating system; (2) message communication between applications across operating systems; (3) communication across different network domains.

When all situations need to be handled by a single application, the difficulty and the complexity of program development may be greatly increased.

SUMMARY

In view of this, the disclosure provides a method and a system for implementing the inter-process communications, which can be used to solve the technical problems.

The disclosure provides a method for implementing inter-process communication. The method includes steps as follows. A first message is sent to at least one forwarding application through a first application according to a first preset inter-process communication mode of the first application, where the first message includes at least transmission data and identification information of a second application. The second application corresponding to the identification information is obtained through the at least one forwarding application in response to the first message. The transmission data is sent to the second application through the at least one forwarding application according to a second preset inter-process communication mode of the second application.

The disclosure provides a system for implementing inter-process communications, which is configured to send a first message to at least one forwarding application through a first application according to a first preset inter-process communication mode of the first application, where the first message includes at least transmission data and identification information of a second application; obtain the second application corresponding to the identification information through the at least one forwarding application in response to the first message; and send the transmission data to the second application through the at least one forwarding application according to a second preset inter-process communication mode of the second application.

DETAILED DESCRIPTION OF DISCLOSED EMBODIMENTS

Figure 1:
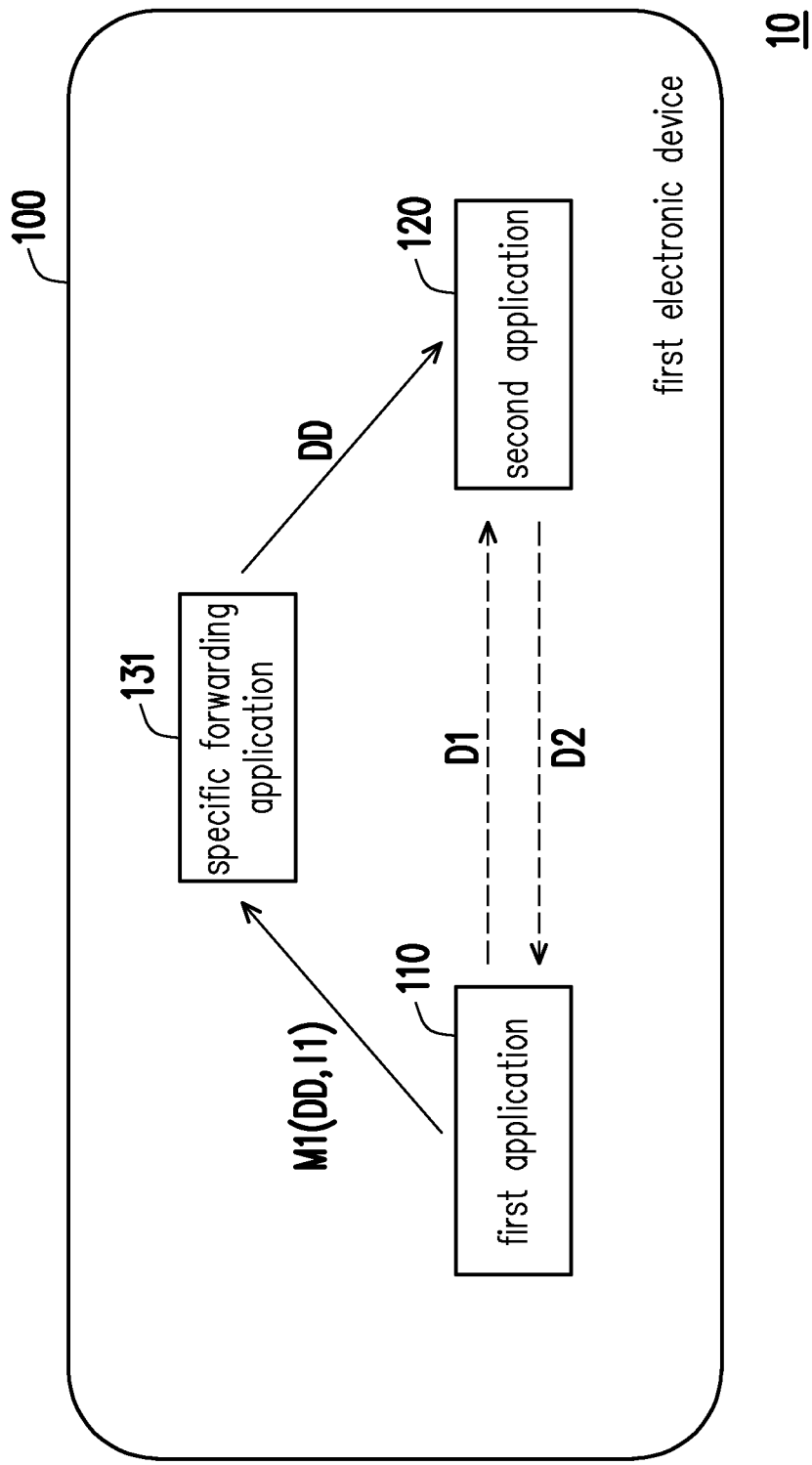
FIG. 1 is a schematic view of a system according to a first embodiment of the disclosure.

Referring to FIG. 1, FIG. 1 is a schematic view of a system according to a first embodiment of the disclosure. In the embodiment, a system 10 includes a first electronic device 100, in which a first application 110, a second application 120, and a specific forwarding application 131 are installed. In different embodiments, for example, the first electronic device 100 may be various physical/virtual smart devices and/or computer devices and may run corresponding operating systems (including but not limited to Android, iOS, Windows, etc.).

In one embodiment, for example, the first application 110 and the second application 120 are various applications installed in the first electronic device 100. For example, when the first electronic device 100 is configured to run the Android operating system, the first application 110 and the second application 120 are respectively Android applications that can be installed, removed, and/or activated by the user. In another example, when the first electronic device 100 is configured to run the iOS operating system, the first application 110 and the second application 120 are respectively iOS applications that can be installed, removed, and/or activated by the user, for example, but the disclosure is not limited thereto.

In one embodiment, for example, the specific forwarding application 131 is a system/management application program that has the authority to manage/access/control the first application 110 and the second application 120, and the specific forwarding application 131 can be run in the background of the first electronic device 100, but the disclosure is not limited thereto.

Generally speaking, when designing an application, a developer may design a preset inter-process communication mode for the application, such as one of bundles, an Android interface definition language (AIDL), content providers, and Socket. Therefore, the first application 110 may be designed with a corresponding first preset inter-process communication mode, and the second application 120 may also be designed with a corresponding second preset inter-process communication mode. The first preset inter-process communication mode may be the same as or different from the second preset inter-process communication mode.

Generally speaking, when the first application 110 wants to send certain transmission data DD to the second application 120, in order for the second application 120 to successfully receive the transmission data DD, the developer of the first application 110 needs to allow the first application 110 to have the ability to send the transmission data DD in the second preset inter-process communication mode. However, since the operation mechanism of each preset inter-process communication mode is quite complicated, the limitation may greatly increase the difficulty for developers in developing the first application 110.

In addition, since the second application 120 of the first application 110 may be closed or enter the sleep mode due to the arrangement of the operating system, the transmission data DD sent by the first application 110 may be lost because the second application 120 is closed. In addition, when the first application 110 is closed or enters the sleep mode due to the arrangement of the operating system, the transmission data from the second application 120 may also be lost.

To facilitate the illustration, it is assumed that the first application 110 and the second application 120 in FIG. 1 are a browser application and a barcode reader application, respectively, but it is not limited thereto. In the existing inter-process communication mechanism (shown as the dashed line in FIG. 1), it is assumed that the first application 110 sends transmission data D1 to the second application 120 for some reason, the second application 120 may execute barcode reading accordingly, and the result of this operation as transmission data D2 is transmitted back to the first application 110. In this case, if the first application 110 is closed/sleeps for some reason before receiving the transmission data D2, the transmission data D2 may be lost, which may prevent the first application 110 from performing subsequent operations.

In addition, for cross-system inter-process communication, the limitations may further increase the challenges during development. For example, if a remote source application wants to have an inter-process communication with a target application in a virtual machine, it usually uses Socket for network transmission. However, if this virtual machine is disposed in a network address translation (NAT) environment, developers may have to solve the problem of NAT penetration through the traversal using replay NAT (TURN) architecture, and this may lead to a significant rise of the development costs.

In view of this, the disclosure proposes a method for implementing inter-process communications, which may be used to solve the technical problems.

In some embodiments, the first electronic device 100 may include a storage circuit and a processor. The storage circuit is any type of fixed or removable random access memory (RAM), read-Only Memory (ROM), flash memory, hard disk, other similar devices, or a combination of these devices, for example, and the storage circuit may be used to record multiple codes or modules.

The processor is coupled to the storage circuit and may be a general purpose processor, a special purpose processor, a conventional processor, a digital signal processor, multiple microprocessors, one or more microprocessors combined with a digital signal processor core, controllers, microcontrollers, application specific integrated circuits (ASICs), field programmable gate arrays (FPGAs), any other types of integrated circuits, state machines, processors based on advanced RISC machines (ARM), and similar products.

In the embodiment of the disclosure, the processor may access the modules and program codes recorded in the storage circuit to implement the method for implementing inter-process communications proposed by the disclosure and the details are illustrated as follows.

Figure 2:
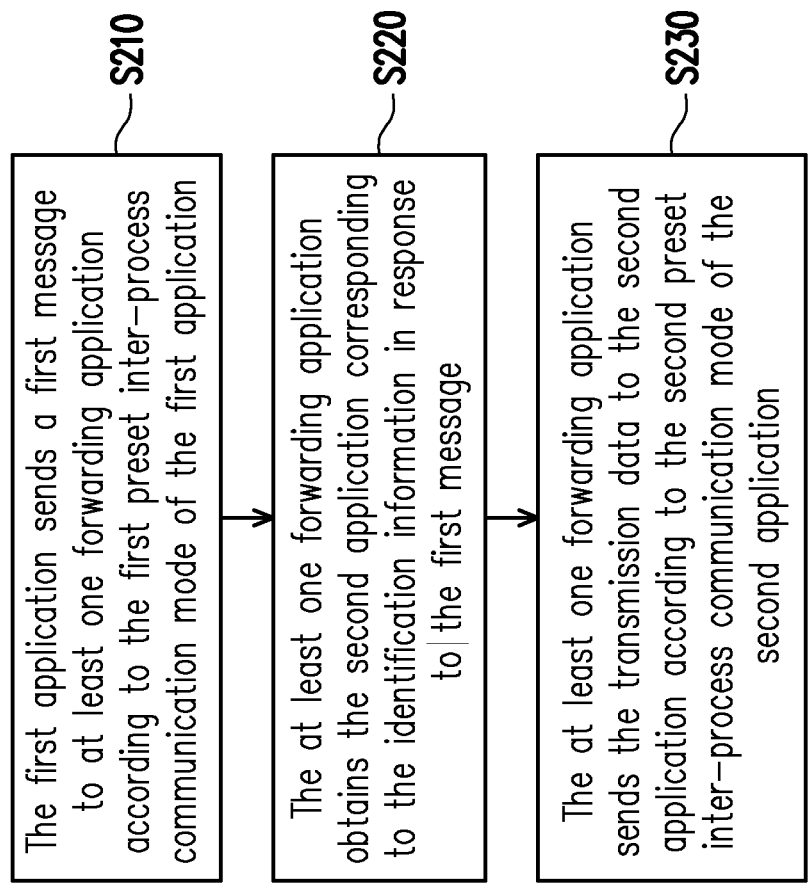
FIG. 2 is a flowchart illustrating a method for implementing inter-process communications according to an embodiment of the disclosure.

Referring to FIG. 2, FIG. 2 is a flowchart illustrating a method for implementing the inter-process communications according to an embodiment of the disclosure. The method of the embodiment may be executed by the first electronic device 100 in FIG. 1. With reference to the elements show in FIG. 1, details of each step are illustrated in FIG. 2.

First, in step S210, the first application 110 sends a first message M1 to at least one forwarding application according to the first preset inter-process communication mode of the first application 110.

In the first embodiment, the first message M1 may include the transmission data DD and identification information I1 of the second application 120. In one embodiment, the identification information I1 is the package name of the second application 120, for example, or other information that can uniquely identify the second application 120, but it is not limited thereto.

In the first embodiment, the at least one forwarding application may include the specific forwarding application 131, and the first application 110 may send the first message M1 to the specific forwarding application 131 according to the first preset inter-process communication mode of the first application 110. Correspondingly, in step S220, the at least one forwarding application obtains the second application 120 corresponding to the identification information I1 in response to the first message M1. As mentioned, the specific forwarding application 131 has the authority to manage/access/control the first application 110 and the second application 120, so the specific forwarding application 131 may find the application corresponding to the identification information I1 from the application installed in the first electronic device 100 as the second application 120, for example, but it is not limited thereto.

Subsequently, in step S230, the at least one forwarding application sends the transmission data DD to the second application 120 according to the second preset inter-process communication mode of the second application 120. In the embodiment of the disclosure, the specific forwarding application 131 may simultaneously support the first preset inter-process communication mode and the second preset inter-process communication mode.

In one embodiment, the specific forwarding application 131 may determine whether the second application 120 is in an activated state (e.g., not in a closed state and/or in a dormant state). In response to the specific forwarding application 131 determining that the second application 120 is in the activated state, the specific forwarding application 131 may directly send the transmission data DD to the second application 120 according to the second preset inter-process communication mode of the second application 120. On the other hand, in response to the specific forwarding application 131 determining that the second application 120 is in a closed state (or other similar state), the specific forwarding application 131 may wake up the second application 120 and send the transmission data DD to the second application 120 according to the second preset inter-process communication mode of the second application 120.

That is, when the second application 120 may receive the transmission data DD, the specific forwarding application 131 may directly send the transmission data DD to the second application 120 through the second preset inter-process communication mode. In addition, when the second application 120 is temporarily unable to receive the transmission data DD for some reason, the specific forwarding application 131 may first save the transmission data DD, and when the second application 120 may receive the transmission data DD, the transmission data DD is sent to the second application 120 in the second preset inter-process communication mode.

In another embodiment, after the specific forwarding application 131 receives the first message M1, the specific forwarding application 131 may first save the transmission data DD. In an embodiment, the second application 120 may send polling signals to the specific forwarding application 131 regularly or irregularly, the specific forwarding application 131 may send the transmission data DD to the second application 120 in the second preset inter-process communication mode when receiving the polling signal from the second application 120.

Accordingly, the first application 110 may directly use the corresponding first preset inter-process communication mode to transmit and/or receive data, so for the developer of the first application 110, there is no need to additionally design the first application 110 with the transmitting function in the second preset inter-process communication mode in order to cooperate with the second application 120. Similarly, when the second application 120 wants to send other transmission data to the first application 110, the second application 120 may directly use the corresponding second preset inter-process communication mode to transmit and/or receive data, and therefore for the developer of the second application 120, there is no need to additionally design the second application 120 with the transmitting function in the first preset inter-process communication mode in order to cooperate with the first application 110. In this way, related development costs may be effectively reduced.

In addition, the transmission data DD may be stored in the specific forwarding application 131, so the loss of the transmission data DD resulting from the second application 120 being unable to receive the data may be prevented.

Figure 3:
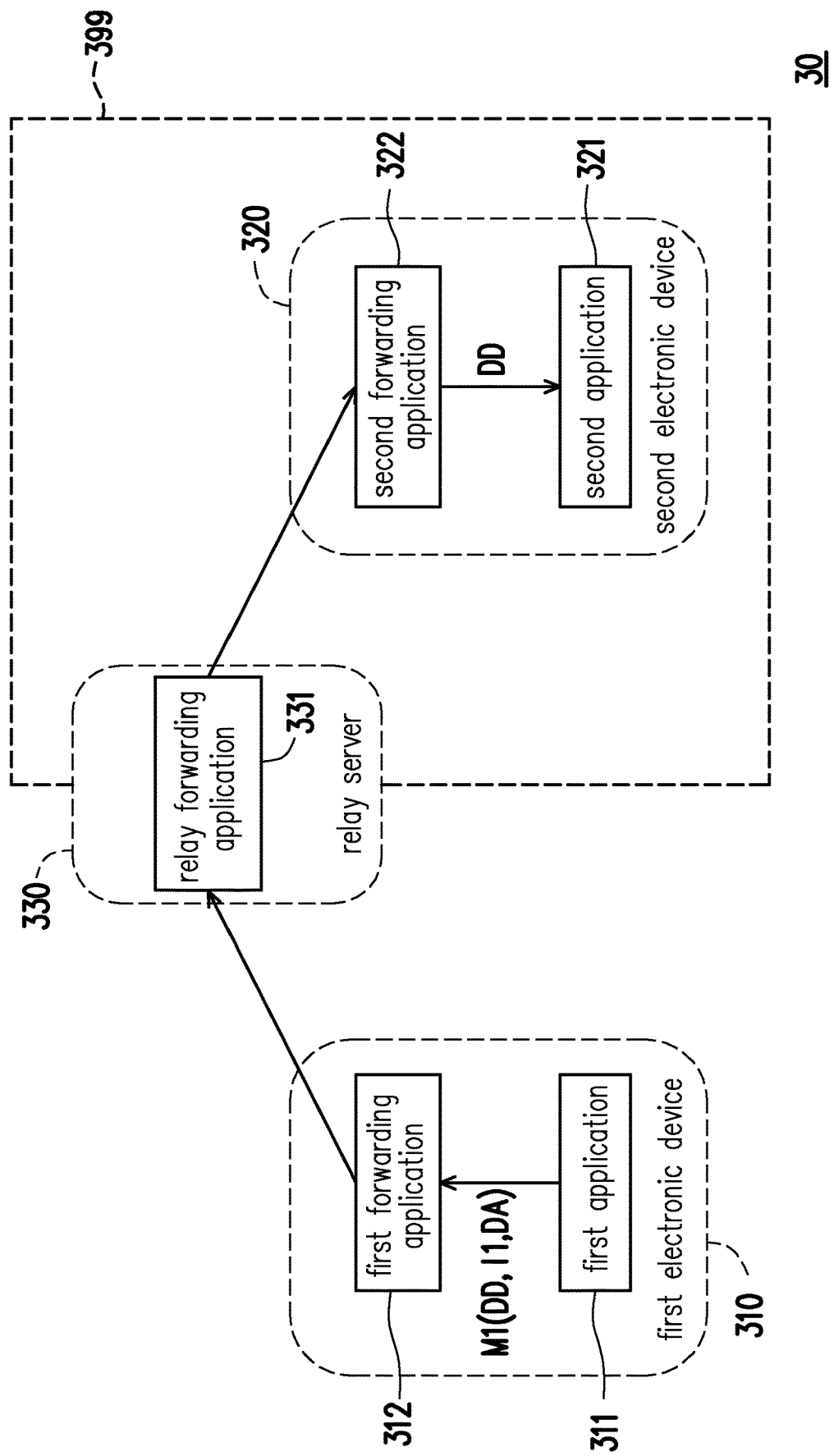
FIG. 3 is a schematic view of a system according to a second embodiment of the disclosure.

In other embodiments, the method of the disclosure may also be applied to cross-device/cross-system inter-process communication, and with reference to FIG. 3, the relevant details are further illustrated.

Referring to FIG. 3, FIG. 3 is a schematic view of a system according to a second embodiment of the disclosure. In FIG. 3, a system 30 includes a first electronic device 310, a second electronic device 320, and a relay server 330. In different embodiments, the first electronic device 310 and the second electronic device 320 are various physical/virtual smart devices and/or computer devices, for example, and the same or different operating system platforms may run in the first electronic device 310 and the second electronic device 320.

In the second embodiment, a first application 311 and a first forwarding application 312 are installed in the first electronic device 310, and a second application 321 and a second forwarding application 322 are installed in the second electronic device 320. In the second embodiment, the concepts of the first application 311 and the second application 321 may refer to the first application 110 and the second application 120 in the first embodiment. In addition, the concepts of the first forwarding application 312 and the second forwarding application 322 may refer to the specific forwarding application 131 in the first embodiment, so the details may not be repeated herein.

In the scenario of FIG. 3, the second electronic device 320 may be disposed in an intranet 399 of a NAT environment, and the first electronic device 310 may be disposed in the Internet of this NAT environment, but it is not limited thereto.

In the second embodiment, a relay forwarding application 331 may be installed in the relay server 330, the relay server 330 may be disposed on the host in the demilitarized zone (DMZ) of the NAT environment, and the relay forwarding application 331 may have network addresses of various electronic devices in the intranet/Internet of this NAT environment and the network address of the relay application (e.g., IP address and/or media access control (MAC) address).

In the second embodiment, the first electronic device 310, the second electronic device 320, and the relay server 330 in the system 30 may also cooperate to implement the method in FIG. 2, which is illustrated in detail as follows.

First, in step S210, the first application 311 sends the first message M1 to at least one forwarding application according to the first preset inter-process communication mode of the first application 311.

In the second embodiment, the first message M1 may include the transmission data DD, the identification information I1 of the second application 321, and a network address DA (e.g., MAC address) of the second forwarding application 322. In one embodiment, for example, the identification information I1 is the package name of the second application 321, or other information that can uniquely identify the second application 321, but it is not limited thereto.

In the second embodiment, the at least one forwarding application may include a first forwarding application 312, a relay forwarding application 331, and the second forwarding application 322, and the first application 311 may send the first message M1 to the first forwarding application 312 according to the first preset inter-process communication mode of the first application 311. After that, the first forwarding application 312 may forward the first message M1 to the relay forwarding application 331.

Correspondingly, in step S220, the at least one forwarding application obtains the 321 321 corresponding to the identification information I1 in response to the first message M1. As mentioned, the relay forwarding application 331 has the network addresses of the intranet/Internet of various electronic devices and the network address of the relay application, so the relay forwarding application 331 may forward the first message M1 to the second forwarding application 322 corresponding to the second application 321 based on the network address DA of the second forwarding application 322, the second forwarding application 322 may find the second application 321 in response to the first message M1.

In one embodiment, for example, the second forwarding application 322 may find the application corresponding to the identification information I1 from the application installed in the second electronic device 320 as the second application 321, but it is not limited thereto.

Subsequently, in step S230, the at least one forwarding application sends the transmission data DD to the second application 321 according to the second preset inter-process communication mode of the second application 321.

In one embodiment, the second forwarding application 322 may determine whether the second application 321 is in an activated state (e.g., not in a closed state and/or in a dormant state). In response to the second forwarding application 322 determining that the second application 321 is in the activated state, the second forwarding application 322 may directly send the transmission data DD to the second application 321 according to the second preset inter-process communication mode of the second application 321. On the other hand, in response to the second forwarding application 322 determining that the second application 321 is in a closed state (or other similar state), the second forwarding application 322 may wake up the second application 321 and send the transmission data DD to the second application 321 according to the second preset inter-process communication mode of the second application 321.

That is, when the second application 321 may receive the transmission data DD, the second forwarding application 322 may directly send the transmission data DD to the second application 321 in the second preset inter-process communication mode. In addition, when the second application 321 is temporarily unable to receive the transmission data DD for some reason, the second forwarding application 322 may first save the transmission data DD, and when the second application 321 may receive the transmission data DD, the transmission data DD is sent to the second application 321 in the second preset inter-process communication mode.

In another embodiment, after the second forwarding application 322 receives the first message M1, the second forwarding application 322 may first save the transmission data DD. In an embodiment, the second application 321 may send polling signals to the second forwarding application 322 regularly or irregularly, the second forwarding application 322 may send the transmission data DD to the second application 321 in the second preset inter-process communication mode when receiving the polling signals from the second application 321.

Accordingly, the first application may directly use the corresponding first preset inter-process communication mode to transmit and/or receive data, so for the developer of the first application 311, there is no need to design the first application 311 with the function of cross-device/cross-operating system transmission in order to cooperate with the second application 321. Similarly, when the second application 321 wants to send other transmission data to the first application 311, the second application 321 may directly use the corresponding second preset inter-process communication mode to transmit and/or receive data, so for the developer of the second application 321, there is no need to design the second application 321 with the function of cross-device/cross-operating system transmission to cooperate with the first application 311.

In addition, although the second electronic device 320 of FIG. 3 is disposed in the intranet of the NAT environment, the developer of the first application 311 does not need to use the TURN architecture to send the transmission data DD to the second application 321 in order to solve the problem of NAT penetration. Instead, the first application 311 only needs to send data in the corresponding first preset inter-process communication mode. In this way, relevant development costs may be effectively reduced.

In addition, since the transmission data DD may be stored in the second forwarding application 322, the loss of the transmission data DD resulting from the second application 321 being unable to receive the data may be prevented.

For easy understanding of the concepts, several other embodiments are illustrated as follows. In one embodiment, it is assumed that the second electronic device 320 is a virtual electronic device implemented as a virtual device, and for example, the second application 321 is an analog GPS sensor running on the virtual electronic device. In this case, the second application 321 may not have the ability to actually measure GPS signals. For the second application 321 to obtain GPS signal related data, the first electronic device 310 may be implemented as a physical electronic device, and the GPS signal may be measured to obtain relevant GPS data through the first application 311 (e.g., a GPS sensor) installed on the first electronic device 310. Subsequently, the first application 311 may transmit the measured GPS data to the second application 321 through the mechanism taught in the second embodiment, so that the second application 321 can execute subsequent applications/operations accordingly.

In one embodiment, when the second forwarding application 322 receives time sequence data such as GPS data, the time sequence data is first sorted according to the data time point of each time sequence data, and then the sorted time sequence data is provided to the second application 321.

Specifically, due to network transmission/routing, the time sequence data received by the second forwarding application 322 may be out of order, so the second forwarding application 322 may first sort the time sequence data according to the teaching, so that the second application 321 may receive the time sequence data in the correct order, but it is not limited thereto.

In one embodiment, it is assumed that the second electronic device 320 is a virtual electronic device implemented as a virtual device, and the second application 321 is a card authentication application running in the virtual electronic device, for example. In this case, the second application 321 may not have the ability to actually read the card information. For the second application 321 to obtain the required card information, the first electronic device 310 may be implemented as a physical electronic device, and the first application 311 (e.g., a card reader) installed therein may be used to read the required card information from the card. Subsequently, the first application 311 may transmit the obtained card information to the second application 321 through the mechanism taught in the second embodiment, so that the second application 321 may execute subsequent applications/operations accordingly.

In summary, by configuring one or more forwarding applications in the electronic device (and relay server) that may support various preset inter-process communication modes, the embodiment of the disclosure allows the application program to use the corresponding preset inter-process communication mode to transmit and/or receive data within the device/cross-device/cross-operating system. In this way, the development cost of the application program may be effectively reduced.

In addition, the forwarding application of the embodiment of the disclosure may save the transmission data in the forwarding application when the application cannot receive the transmission data, so the loss of the transmission data may further be prevented.

From another point of view, in a conventional network environment, message transmission requires a connection channel to be established at the sender and receiver before transmitting messages, and this may increase a lot of costs. For example, the receiver has to open the Socket all the time to wait for the message to be transmitted, and this is an additional cost for the system.

However, the embodiments of the disclosure propose that a third-party program (i.e., a forwarding application) is used to send and receive messages, and all messages are sent and received through the third-party forwarding application. In this case, the application only needs to communicate with the forwarding application without handling the transmission of messages by itself. Accordingly, when the application wants to send messages to multiple receivers, there is no need for the application to maintain the connection with these receivers by itself, which may save a lot of costs in development and use. For example, when an application wants to send a message to multiple external mobile devices, the conventional application needs to establish connections and communicate with each mobile device by itself. However, if the concept proposed by the disclosure is adopted, the application only needs to send the message to the forwarding application, and then the forwarding application sends the message to each mobile device through the established connection. In this way, in addition to saving the cost of application delivery, the development cost of the application may also be reduced.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A method for implementing inter-process communications, comprising:
   sending a first message to at least one forwarding application through a first application according to a first preset inter-process communication mode of the first application, wherein the first message comprises at least transmission data and identification information of a second application;
   obtaining the second application corresponding to the identification information through the at least one forwarding application in response to the first message; and
   sending the transmission data to the second application through the at least one forwarding application according to a second preset inter-process communication mode of the second application.

2. The method for implementing the inter-process communications according to claim 1, wherein the identification information of the second application comprises a package name of the second application.

3. The method for implementing the inter-process communications according to claim 1, wherein the first preset inter-process communication mode is different from the second preset inter-process communication mode.

4. The method for implementing the inter-process communications according to claim 1, wherein the first application, the second application, and the at least one forwarding application are all installed in a first electronic device, the at least one forwarding application comprises a specific forwarding application, and the step of sending the transmission data to the second application through the at least one forwarding application according to the second preset inter-process communication mode of the second application comprises;
   in response to determining that the second application is in an activated state, directly sending the transmission data to the second application through the specific forwarding application according to the second preset inter-process communication mode of the second application; and
   in response to determining that the second application is in a closed state, waking up the second application and sending the transmission data to the second application through the specific forwarding application according to the second preset inter-process communication mode of the second application.

5. The method for implementing the inter-process communications according to claim 1, wherein the first application, the second application, and the at least one forwarding application are all installed in a first electronic device, the at least one forwarding application comprises a specific forwarding application, and the step of sending the transmission data to the second application through the at least one forwarding application according to the second preset inter-process communication mode of the second application comprises:
   in response to the specific forwarding application receiving a polling signal from the second application, sending the transmission data to the second application through the specific forwarding application according to the second preset inter-process communication mode of the second application.

6. The method for implementing the inter-process communications according to claim 1, wherein the first application and the second application are installed in a first electronic device and a second electronic device, respectively, the at least one forwarding application comprises a first forwarding application, a second forwarding application, and a relay forwarding application, the first forwarding application, the second forwarding application, and the relay forwarding application are disposed in the first electronic device, the second electronic device and a relay server, respectively, and the step of sending the first message to the at least one forwarding application through the first application according to the first preset inter-process communication mode of the first application comprises:
   sending the first message to the first forwarding application through the first application according to the first preset inter-process communication mode of the first application, wherein the first message further comprises a network address of the second forwarding application; and
   forwarding the first message through the first forwarding application to the relay forwarding application.

7. The method for implementing the inter-process communications according to claim 6, wherein the relay server is disposed on a host in a demilitarized zone.

8. The method for implementing the inter-process communications according to claim 6, wherein the step of obtaining the second application corresponding to the identification information through the at least one forwarding application in response to the first message comprises:
   forwarding the first message to the second forwarding application corresponding to the second application through the relay forwarding application based on the network address of the second forwarding application, wherein the second forwarding application finds the second application in response to the first message.

9. The method for implementing the inter-process communications according to claim 8, wherein the step of sending the transmission data to the second application through the at least one forwarding application according to the second preset inter-process communication mode of the second application comprises:
   in response to determining that the second application is in an activated state, directly sending the transmission data to the second application through the second forwarding application according to the second preset inter-process communication mode of the second application; and
   in response to determining that the second application is in a closed state, waking up the second application and sending the transmission data to the second application through the second forwarding application according to the second preset inter-process communication mode of the second application.

10. The method for implementing the inter-process communications according to claim 8, wherein the step of sending the transmission data to the second application through the at least one forwarding application according to the second preset inter-process communication mode of the second application comprises:
in response to the second forwarding application receiving a polling signal from the second application, sending the transmission data to the second application through the second forwarding application according to the second preset inter-process communication mode of the second application.

11. The method for implementing the inter-process communications according to claim 8, wherein the transmission data comprises at least one time sequence data, and before the step of sending the transmission data to the second application through the at least one forwarding application according to the second preset inter-process communication mode of the second application, the method further comprises:
sorting the at least one time sequence data through the second forwarding application according to a data time point of each time sequence data.

12. The method for implementing the inter-process communications according to claim 6, wherein the first application and the second application correspond to different operating system platforms.

13. The method for implementing the inter-process communications according to claim 6, wherein the second electronic device is disposed in an intranet of a network address translation (NAT) environment, and the first electronic device is disposed in an Internet of the network address translation (NAT) environment.

14. The method for implementing the inter-process communications according to claim 6, wherein at least one of the first electronic device and the second electronic device is a virtual device.

15. The method for implementing the inter-process communications according to claim 1, wherein the first preset inter-process communication mode comprises one of bundles, an Android interface definition language (AIDL), content providers, and Socket, the second preset inter-process communication mode comprises the other one of bundles, an Android interface definition language (AIDL), content providers, and Socket.

16. A system for implementing inter-process communications, configured to:
send a first message to at least one forwarding application through a first application according to a first preset inter-process communication mode of the first application, wherein the first message comprises at least transmission data and identification information of a second application;
obtain the second application corresponding to the identification information through the at least one forwarding application in response to the first message; and
send the transmission data to the second application through the at least one forwarding application according to a second preset inter-process communication mode of the second application.

17. The system for implementing the inter-process communications according to claim 16, wherein the system comprises a first electronic device, the first application, the second application, and the at least one forwarding application are all installed in a first electronic device, the at least one forwarding application comprises a specific forwarding application, and the first electronic device is configured to:
in response to determining that the second application is in an activated state, directly send the transmission data to the second application through the specific forwarding application according to the second preset inter-process communication mode of the second application; and
in response to determining that the second application is in a closed state, wake up the second application and send the transmission data to the second application through the specific forwarding application according to the second preset inter-process communication mode of the second application.

18. The system for implementing the inter-process communications according to claim 16, wherein the system comprises a first electronic device, the first application, the second application, and the at least one forwarding application are all installed in the first electronic device, the at least one forwarding application comprises a specific forwarding application, and the first electronic device is configured to:
in response to the specific forwarding application receiving a polling signal from the second application, send the transmission data to the second application through the specific forwarding application according to the second preset inter-process communication mode of the second application.

19. The system for implementing the inter-process communications according to claim 16, wherein the system comprises a first electronic device, a second electronic device, and a relay server, the first application and the second application are installed in the first electronic device and the second electronic device, respectively, the at least one forwarding application comprises a first forwarding application, a second forwarding application, and a relay forwarding application, the first forwarding application, the second forwarding application, and the relay forwarding application are disposed in the first electronic device, the second electronic device and a relay server, respectively, wherein the first electronic device is configured to:
send the first message to the first forwarding application through the first application according to the first preset inter-process communication mode of the first application, wherein the first message further comprises a network address of the second forwarding application; and
forward the first message through the first forwarding application to the relay forwarding application.

20. The system for implementing the inter-process communications according to claim 19, wherein the relay server is configured to:
forward the first message to the second forwarding application corresponding to the second application through the relay forwarding application based on the network address of the second forwarding application.

21. The system for implementing the inter-process communications according to claim 20, wherein the second electronic device is configured to:
in response to determining that the second application is in an activated state, directly send the transmission data to the second application through the second forwarding application according to the second preset inter-process communication mode of the second application; and in response to determining that the second application is in a closed state, wake up the second application and send the transmission data to the second application through the second forwarding application according to the second preset inter-process communication mode of the second application.

22. The system for implementing the inter-process communications according to claim 20, wherein the second electronic device is configured to:
in response to the second forwarding application receiving a polling signal from the second application, send the transmission data to the second application through the second forwarding application according to the second preset inter-process communication mode of the second application.

* * * * *